United States Patent
Aslam

(10) Patent No.: US 10,444,109 B2
(45) Date of Patent: Oct. 15, 2019

(54) METHODS FOR DETECTING LEAKS FOR PHARMACEUTICAL PACKAGES SUCH AS PARENTERAL PACKAGES AND BULK PHARMACEUTICAL BAGS

(71) Applicant: Naveed Aslam, Houston, TX (US)

(72) Inventor: Naveed Aslam, Houston, TX (US)

(73) Assignee: Linde Aktiengesellschaft (DE)

(*) Notice: Subject to any disclaimer, the term of this patent is extended or adjusted under 35 U.S.C. 154(b) by 379 days.

(21) Appl. No.: 15/486,784

(22) Filed: Apr. 13, 2017

(65) Prior Publication Data

US 2018/0299343 A1 Oct. 18, 2018

(51) Int. Cl.
*G01M 3/22* (2006.01)
*G01M 3/20* (2006.01)

(52) U.S. Cl.
CPC ............. *G01M 3/226* (2013.01); *G01M 3/20* (2013.01)

(58) Field of Classification Search
CPC ........ G01M 3/226; G01M 3/225; G01M 3/00; G01M 3/007; G01M 3/20
See application file for complete search history.

(56) References Cited

U.S. PATENT DOCUMENTS

| | | | |
|---|---|---|---|
| 7,752,892 B2* | 7/2010 | Muller | G01M 3/229 73/49.2 |
| 2007/0152361 A1* | 7/2007 | Hansen | B01D 1/18 264/5 |
| 2016/0209293 A1* | 7/2016 | Luemkemann | G01M 3/24 |
| 2017/0227002 A1* | 8/2017 | Mikulski | F04B 15/08 |

* cited by examiner

*Primary Examiner* — David Z Huang

(74) *Attorney, Agent, or Firm* — Robert J. Hampsch

(57) ABSTRACT

A method for leak detection of a packaged sealed product according to the steps: feeding liquid nitrogen to a vaporizer thereby forming gaseous nitrogen; mixing the gaseous nitrogen with multifunctional particles; feeding the mixture of gaseous nitrogen and multifunctional particles to a chamber wherein a packaged sealed product is present in the chamber; and transmitting a signal when the multifunctional particles contact a component leaking from the packaged sealed product. Typically, the packaged sealed product is a pharmaceutical or other medicinal product.

18 Claims, 1 Drawing Sheet

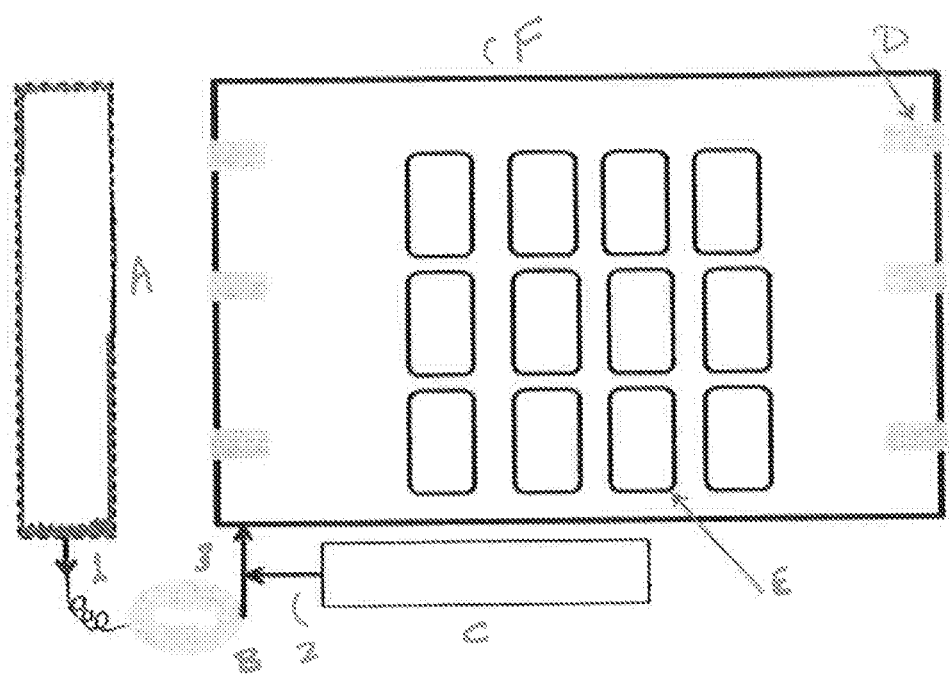

METHODS FOR DETECTING LEAKS FOR PHARMACEUTICAL PACKAGES SUCH AS PARENTERAL PACKAGES AND BULK PHARMACEUTICAL BAGS

BACKGROUND OF THE INVENTION

Several technologies are available to carry out leak detection in parental packaging. However, there are concerns with any detection mechanism as to how a package defect becomes a leak and mechanisms through which imposed pressures generated within a package during distribution and packaging of given products. There is also data available on the threshold of leak size to the critical leak size and its effects on the loss of package sterility. The threshold size is defined as a hole size at which onset of leakage occurs and threshold pressure is that which is required to develop a leak.

It is also known that fine particles at sub-micron scale can exhibit interesting optical properties and their optical characteristics can be tuned according to the environment they are exposed to.

The assurance of sterility maintenance is one of the prime concerns for procedures of aseptically packaged products. For the producers of aseptically packaged products, the low-cost, one hundred percent non-destructive, on-line inspection and evaluation of packaged products remains a top priority and somewhat unrealized. Any system or method which can reliably provide the information on the leak and integrity characteristics of packaged product is highly desired not only by pharmaceutical manufacturers by also by regulatory agencies like the FDA.

A leak in this context is defined as a breach in a package all, or a gap between package components which is capable of permitting the passage of a gas or liquid. Leaks in packaged products are rarely dimensionally uniform. They tend to be complex, multi-cavity tortuous paths. The integrity of a sterile product package keeps the product continents in their own containers.

As such, the key objectives in considering leak integrity testing are to keep the product contents in the container and to prevent environmental contaminants such as microorganisms, reactive gas and other substances from entering the container.

Usually leak rates as low as $2\times10^{-2}$ mbar-liter/sec is considered to be significant enough to cause a loss of sterility or allow for micro-organism ingress.

The package integrity related recalls continue to cause problems for the pharmaceutical industry and multiple package types are impacted. For example, syringes, cartridges, vials, IV bags and ophthalmic solution bottles.

As such, there is a recognized need for a non-destructive leak testing and package development practice to guard against these shortcomings.

SUMMARY OF THE INVENTION

In a first embodiment of the invention, there is disclosed a method for leak detection comprising the steps:
a) Feeding liquid nitrogen to a vaporizer thereby forming gaseous nitrogen wherein either the liquid nitrogen or gaseous nitrogen is sterilized;
b) Mixing the gaseous nitrogen with multifunctional particles;
c) Feeding the mixture of gaseous nitrogen and multifunctional particles to a chamber wherein a packaged sealed product is present in the chamber; and
d) Transmitting a signal when the multifunctional particles contact a component leaking from the packaged sealed product.

In a second embodiment of the invention, there is disclosed a method for leak detection of a component from a packaged sealed product comprising the steps:
a) Feeding liquid nitrogen to a vaporizer thereby forming gaseous nitrogen wherein either the liquid nitrogen or gaseous nitrogen is sterilized;
b) Mixing the gaseous nitrogen with multifunctional particles;
c) Feeding the mixture of gaseous nitrogen and multifunctional particles to a chamber wherein a packaged sealed product is present in the chamber; and
d) Transmitting a signal when the multifunctional particles contact a component leaking from the packaged sealed product.

The liquid nitrogen or gaseous nitrogen will be fed through a sterile filtration system to sterilize the liquid or gaseous nitrogen before mixing with the multifunctional particles.

The signal that is transmitted will be received by an appropriate receiver which will forward the data present in the signal to a programmable logic controller (PLC) which will interpret the signal for the leak and integrity characteristics of the packaged sealed product.

The multifunctional particles will provide a distinct optical, electrical or color change response which will indicate that a leak event is occurring. The signal that is generated by the multifunctional particle will be received by an appropriate receiver depending upon the type of particle.

For purposes of the invention three distinct types of particles are utilized in determining if a leak condition is present in a packaged sealed product.

The first particles are luminescent nano-particles which have the capability to switch on or off as they interact with a fluid or material at a leak site. These specific particles can switch their response as they move from being in a mixture with nitrogen gas to a leak site and interact with water or other fluids at the leak point. The change in response further can be linked with the size of the leak as well as the rate of the leak.

The second particles that can be employed in the methods of this invention are electro-conductive polymer based nano-particles. These fine particles exhibit a change in electrical conductivity as they interact with a leak site. This change in conductivity could in turn be linked with integrity and leak characteristics of a container and could be pin-pointed to specific locations as to which container or packages may have integrity issues.

A third set of particles that has utility in the present application are color sensitive polymer or enzymatic bio-sensors. The polymer or enzyme encapsulated particle interacts with the leak site through the outer polymer or enzyme. This interaction will induce a color change which can be detected and correlated with the characteristics of a leak site.

Leaks can be detected at a threshold ranging from 0.3 to 10 microns in size. Accordingly, the multifunctional particles are comparable in size. The switchable nature of these multifunctional particles allows them to interact with the leaking material in or at the leak hole and have their switchable nature activate. Whether this switchable nature is optical, electrical or color characteristics, when the multifunctional particles contact the substance that is leaking from the packaging, their switchable nature will be activated. This switching will therefore be detected by the detectors and an alert that a leak condition is present will be transmitted to the operator.

In the instance where optical particles are employed, these will have an optically active or inactive molecule, i.e., the chemical molecule will be attached to a nano- or micro-scale inorganic article through a linker. As this assembly comes closer physically to a leak location or leak site, the optically active molecule will interact with the leak site and either turn off or turn on thereby providing a signal which can be measured through optical sensors in an inexpensive manner.

Likewise, for electroactive polymers, when inserted into a carrier nitrogen gas, they will change their electro-active properties when in physical proximity to a leak and the response could be measured through changes in electrical resistance of the particles and correlated with leak characteristics of packaged products.

The detectors employed are commercially available and relatively inexpensive. Whether optical, electrical or magnetic, these detectors can be mounted in the testing chamber in a manner to measure the relevant multifunctional particle. An optical system would be based on a light generating source through a light or LED active material which will generate light. As this light shines on the active nitrogen borne particles, depending on their state, their response would be noted. If they are "on", the could reflect the light and provide a signature signal; if they are "off", they will quench the light and that response would be noted.

The detectors will typically communicate the information they receive automatically through a computer program or data collection system. These detectors will provide the operator with the location and magnitude of the packages that are leaking which will allow for passing all other packages and removing only the leaking one. The operator can thereby pass all non-leaking packages for shipping and distribution. In this manner, the operator can reliably scan every package for container closure and integrity (CCI) testing.

Through the methods of the present invention, the amount and the size of the leak can be detected as well as the location of the leak.

Preferably, liquid nitrogen/gaseous nitrogen is used as the sterile carrier but argon or helium could also be used.

A number of different packages can be tested by the methods of the present invention. For example, packages such as ampoules, syringes, pouches, pads and bulk pharmaceutical bags could be tested for leaks.

These packages are typically prepared from materials such as glass, plastics and polymers such as HDPE and EVA.

The present invention can test for a variety of products. Typically, the products could be selected from the group consisting of injectable, bulk drug solutions, sterile products, solid dosage forms and biopharmaceuticals.

The methods of the present invention could be applied to other testing such as food packaging rather than hydrogen or helium currently employed.

BRIEF DESCRIPTION OF THE DRAWINGS

The FIGURE is a schematic of a leak detection process according to the invention.

DETAILED DESCRIPTION OF THE INVENTION

The FIGURE shows a schematic of an assembly for the detection of leaks in a packaged sealed product. A source of liquid nitrogen A which can be a cylinder, bulk container or other storage device feeds the liquid nitrogen to a filter B through line 1. Line 1 will transfer the liquid nitrogen through a vaporizer to vaporize the liquid nitrogen which will turn it into gaseous nitrogen. The filter B is typically a 0.2 micron filter and assists in sterilizing the gaseous nitrogen before it contacts the multifunctional particles. The filter B feeds the sterilized gaseous nitrogen through line 3 where it will intersect with line 2 which delivers the multifunctional particles from their storage container C.

These multifunctional particles are selected from the group consisting of luminescent nano-particles, electroconductive polymer based nano-particles, and color sensitive polymer or enzymatic biosensors. These multifunctional particles will contact the sterilized gaseous nitrogen in line 3 and will mix with the sterile gaseous nitrogen before entering the testing chamber F.

This testing chamber F is typically made of glass and is designed to be air tight and hold nitrogen gas under pressure as well as packaged pharmaceutical products.

Typically, this testing chamber F will be cylindrical in shape and contain either shelves or other holding devices for holding packages. The testing chamber F as noted will be air tight and could be configured to be placed at the end of a filling line. In that situation, there could be two testing chambers with a first chamber being filled with packages, bags or ampoules to be tested, while the second testing chamber could be in testing mode.

The dimensions of the testing chamber F could vary depending upon the type and size of a batch of the product to be tested but typically, the dimensions would be about 6 to 8 feet (1.8 to 2.4 meters) in length, 4 to 5 feet (1.2 to 1.5 meters) in height and 5 to 6 feet (1.5 to 1.8 meters) deep. The testing chamber could be fabricated from glass or aluminum and would be fitted with sensors to detect the defects in the containers being tested.

The testing chamber F contains the sealed product packages E which can range in number from 1 to about 10,000 sealed product packages, with preferably 1 to 1000 and 1 to 5000 sealed product packages preferred. These sealed product packages E will contain pharmaceutical products but may also contain bulk drug solutions, buffers or sterile products. The gaseous nitrogen and multifunctional particle mixture will disseminate through the testing chamber F and will in particular come into contact with the sealed packaged products E.

If these multifunctional particles contact a leak site on the sealed packaged products E, they will activate in the sense that they will change electrically, optically or by color indicating that they have contacted the particular molecule that is being tested for. Accordingly, the multifunctional particles will give off a signal that will be detected by the detectors D present in the testing chamber F.

These detectors are typically optical detectors and they will receive the data encoded in the signal and forward this data to a process logic controller which will interpret the data and provide the operator with information such as which sealed packaged product is leaking; how big the leak is; how intense or how much volume is leaking; and any related information to allow the operator to determine through its quality control means to remove the leaking sealed packaged products from the testing chamber and prior to packaging for shipment and merchandising.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what I claim is:

1. A method for leak detection comprising the steps:
    a) vaporizing liquid nitrogen to gaseous nitrogen wherein either the liquid nitrogen or the gaseous nitrogen is sterilized;
    b) mixing the gaseous nitrogen with multifunctional particles;
    c) feeding the mixture of gaseous nitrogen and multifunctional particles to a chamber wherein a packaged sealed product is present in the chamber; and
    d) transmitting a signal when the multifunctional particles contact a component leaking from the packaged sealed product;
    wherein the multifunctional particles are selected from the group consisting of luminescent nano-particles, electro-conductive polymer based nano-particles and color sensitive polymer nano-particles.

2. The method as claimed in claim 1 wherein the liquid nitrogen or the gaseous nitrogen is fed through a sterile filtration system.

3. The method as claimed in claim 1 wherein the multifunctional particles switch their state when they contact the component leaking from the packaged sealed product, the switching of the multifunctional particles state defined as a switch state.

4. The method as claimed in claim 3 wherein the switch state of the multifunctional particles is selected from the group consisting of an optical switch state, an electrical switch state and a color switch state.

5. The method as claimed in claim 4 wherein the optical switch state is on and off.

6. The method as claimed in claim 4 wherein the electrical switch state is electrical conductivity.

7. The method as claim in claim 4 wherein the color switch state is induced color change.

8. The method as claimed in claim 4 wherein a detector measures the switch state of a multifunctional particle.

9. The method as claimed in claim 8 wherein the detector is selected from the group of detectors consisting of optical detectors, electrical detectors, and magnetic detectors.

10. The method as claimed in claim 8 wherein the detector issues an alert to an operator.

11. The method as claimed in claim 1 wherein the signal is received by a receiver which is in electronic communication with a programmable logic controller.

12. The method as claimed in claim 1 wherein a location of the component leaking from the packaged sealed product can be detected.

13. The method as claimed in claim 1 wherein a magnitude of the component leaking from the packaged sealed product can be detected.

14. The method as claimed in claim 1 wherein a leak of the component is detected at a threshold of 0.3 to 10 microns in size.

15. The method as claimed in claim 1 wherein the packaged sealed product is selected from the group consisting of ampoules, syringes, pouches, pads and bulk pharmaceutical bags.

16. The method as claimed in claim 15 wherein the packaged sealed product is removed from the chamber when a leak condition is detected.

17. The method as claimed in claim 16 wherein the component is selected from the group consisting of injectables, bulk drug solutions, sterile products, solid dosage forms and biopharmaceuticals.

18. The method as claimed in claim 1 wherein the chamber contains 1 to 10,000 packaged sealed products.

* * * * *